(12) United States Patent
Manda

(10) Patent No.: US 7,465,166 B2
(45) Date of Patent: Dec. 16, 2008

(54) INJECTION MOLDING SYSTEM HAVING A HOT RUNNER ASSEMBLY

(75) Inventor: Jan Marius Manda, Toronto (CA)

(73) Assignee: Husky Injection Molding Systems Ltd., Bolton, ON (CA)

(*) Notice: Subject to any disclaimer, the term of this patent is extended or adjusted under 35 U.S.C. 154(b) by 236 days.

(21) Appl. No.: 11/503,018

(22) Filed: Aug. 11, 2006

(65) Prior Publication Data

US 2008/0038401 A1 Feb. 14, 2008

(51) Int. Cl.
*B29C 45/18* (2006.01)
(52) U.S. Cl. .................................................. 425/572
(58) Field of Classification Search .............. 425/572, 425/588
See application file for complete search history.

(56) References Cited

U.S. PATENT DOCUMENTS 3,464,091 A * 9/1969 Bielfeldt ..................... 425/574
4,332,544 A * 6/1982 Aoki ......................... 425/574
5,837,301 A 11/1998 Arnott et al.
6,893,599 B2 5/2005 Howell

FOREIGN PATENT DOCUMENTS

JP 59071837 A 4/1984

* cited by examiner

*Primary Examiner*—Tim Heitbrink

(57) ABSTRACT

Disclosed is: a hot runner assembly of a molding system, including: a hot runner having a drop connectable to a gate of a mold defining a mold cavity, the mold and the hot runner orientable relative to each other so as to connect the drop in a selected location relative to the mold cavity; and a rotatable ring mounted to a stationary platen and fixedly mounted to the hot runner, the rotatable ring accommodating rotatable adjustable mounting of the hot runner relative to the stationary platen.

34 Claims, 4 Drawing Sheets

# INJECTION MOLDING SYSTEM HAVING A HOT RUNNER ASSEMBLY

TECHNICAL FIELD

The present invention generally relates to, but is not limited to, molding systems, and more specifically the present invention relates to, but is not limited to, (i) a hot runner assembly of a molding system, (ii) a molding system including a hot runner assembly, (iii) a method of a molding system, and/or (iv) a mold of a molding system, amongst other things.

BACKGROUND

Examples of known molding systems are (amongst others): (i) the HyPET™ Molding System, (ii) the Quadloc™ Molding System, (iii) the Hylectric™ Molding System, and (iv) the HyMet™ Molding System, all manufactured by Husky Injection Molding Systems Limited (Location: Bolton, Ontario, Canada; www.husky.ca).

U.S. Pat. No. 5,837,301 (Inventor: Arnott et al; Published Nov. 17, 1998) discloses an injection molding machine that includes a first mold half having one of at least one mold cavity and at least one mold core and a rotatable turret block rotatable on an axis for rotating at least one movable mold half thereof into alignment with the first mold half. Each of the movable mold halves include one of at least one mold cavity and at least one mold core matable with the first mold half for forming a mold for molding a molded article. The rotatable turret block is further for clamping the movable mold halves and the first mold half together. The machine further includes a mechanism for moving the rotatable turret block relative the first mold half and a mechanism for rotating the rotatable turret means, wherein the mechanism for moving is linked to the mechanism for rotating, and a first injector for injecting melt into the at least one mold cavity.

U.S. Pat. No. 6,893,599 (Inventor: Howell; Published: May 17, 2005) discloses a mold for use in a reaction injection molding method and system to make a reinforced polymeric article having reduced surface defects. The mold includes a novel gating system. The mold includes (i) a pair of mold sections which define a closed, article-forming cavity, (ii) an injection aperture, and an after-mixer which helps to form a plurality of flow paths which extend downstream from the injection aperture toward the article-forming cavity to further mix a curable, multi-component, reaction fluid mixture including filler. The flow paths are also at least partially defined by an elongated film gate and an elongated runner which extends along and is in fluid communication with the film gate along substantially the entire length of the film gate. The runner has a closed end and an open end into which a fluid mixture for the article flows for distribution by the runner into the film gate.

Generally, known molding system include (i) a molding machine and (ii) molding tools that the molding machine uses to make molded articles. The molding tools are considered to be consumable or expendable parts of the molding system. Typically, the molding machine includes an extruder (for example, an injection unit), platens, platen stroking actuators for stroking the platens and clamping mechanisms for applying a clamping force to the platens, etc. Typically, the molding tools include a mold (mountable to the platens) and a hot runner that is configured to be used with the mold. When the mold is changed for another mold, the hot runner is also changed in favor of using another hot runner with the other mold (alternatively, the hot runner may be modified, albeit with some difficulty and expense). In this manner the hot runner is not considered to be part of the molding machine per se. It is an expensive proposition to have a dedicated hot runner for each mold.

SUMMARY

According to a first aspect of the present invention, there is provided a hot runner assembly of a molding system, including a hot runner having a drop connectable to a gate of a mold defining a mold cavity, the mold and the hot runner orientable relative to each other so as to connect the drop in a selected location relative to the mold cavity.

According to a second aspect of the present invention, there is provided a molding system, including (i) an extruder having a machine nozzle, (ii) a stationary platen, (iii) a movable platen configured to mountably accommodate a mold at least in part, (iv) a hot runner assembly, including a hot runner having a drop connectable to a gate of the mold defining a mold cavity, the mold and the hot runner orientable relative to each other so as to connect the drop in a selected location relative to the mold cavity.

According to a third aspect of the present invention, there is provided a method of a molding system, including orienting a mold and a hot runner relative to each other so as to connect a drop of the hot runner in a selected location relative to the mold cavity of the mold, the drop connectable to a gate of the mold.

According to a fourth aspect of the present invention, there is provided a mold of a molding system, including a mold body cooperative with a hot runner assembly, the hot runner having a drop connectable to a gate of the mold body, the mold body defining a mold cavity, the mold and the hot runner orientable relative to each other so as to connect the drop in a selected location relative to the mold cavity.

According to a fifth aspect of the present invention, there is provided a molding system, including a hot runner having a drop connectable to a gate of a mold defining a mold cavity, the mold and the hot runner orientable relative to each other so as to connect the drop in a selected location relative to the mold cavity.

A technical effect, amongst other technical effects, of the aspects of the present invention is cost reduction by treating a hot runner as part of a molding machine (that is, reusing the same hot runner for different molds, in sharp contrast to the state of the art treatment of hot runners).

BRIEF DESCRIPTION OF THE DRAWINGS

A better understanding of the exemplary embodiments of the present invention (including alternatives and/or variations thereof) may be obtained with reference to the detailed description of the exemplary embodiments of the present invention along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
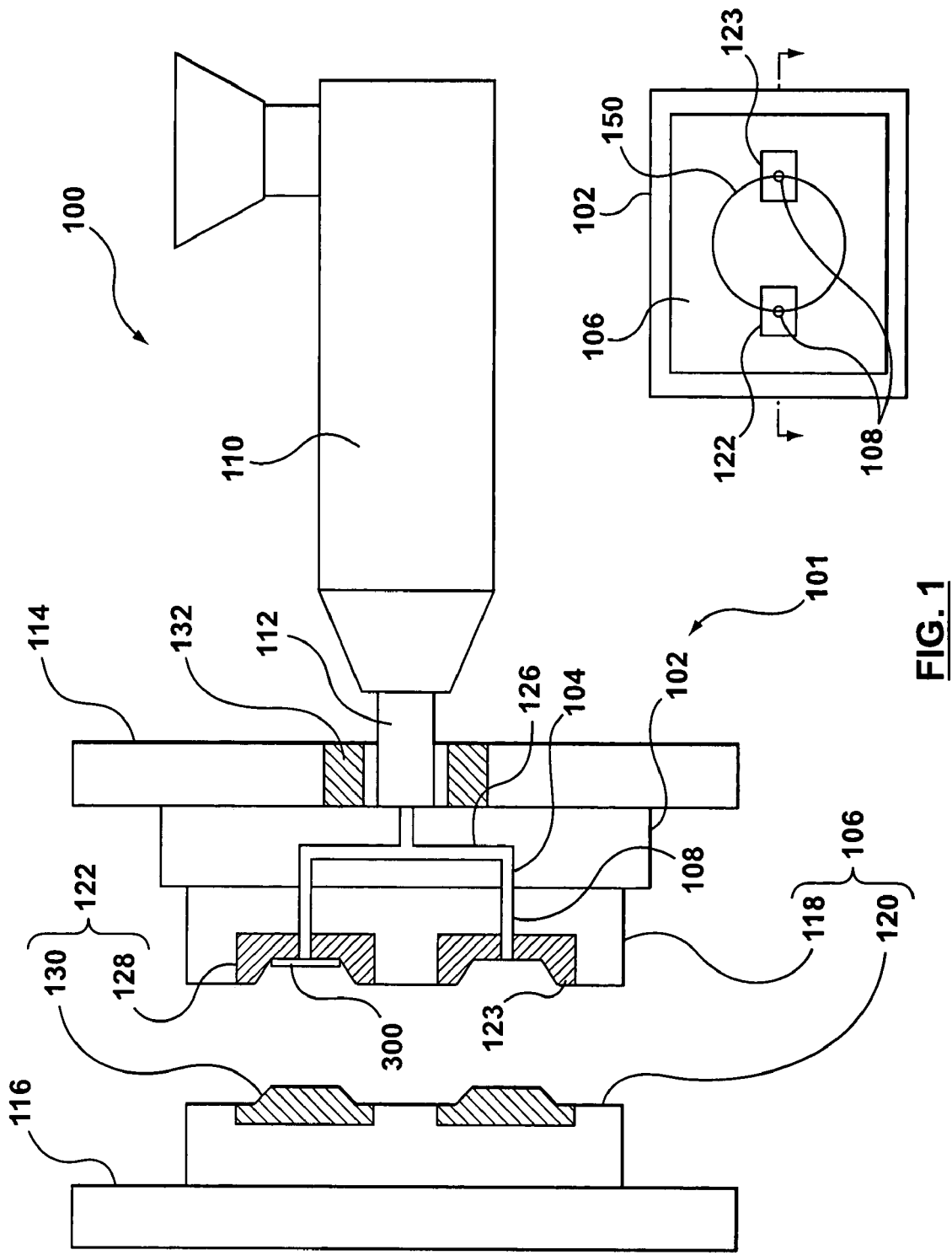
FIG. 1 is a schematic representation of a molding system according to a first exemplary embodiment (which is the preferred embodiment)

FIG. 1 is a schematic representation of a molding system 100 (hereafter referred to as the "system 100") having a hot runner assembly 101 according to the first exemplary embodiment. The hot runner assembly 101 includes a hot runner 102 having a drop 104 that is connectable to a gate 108 of a mold 106 defining a mold cavity 124. The mold 106 and the hot runner 102 are orientable relative to each other so as to connect the drop 106 in a selected location relative to the mold cavity 124. The drop 104 and the gate 108 are accommodatable of selective gating of an article to be molded in the mold 106. For example (with reference to FIG. 1), the drop 104 and the gate 108 may be aligned and connected together so as to accommodate center gating of an article 300 to be molded in the mold 122. Alternatively, for example (with reference to FIG. 3), the drop 104 and the gate 108 may be realigned and reconnected together so as to accommodate edge gating of an article 302 to be molded in the mold 140.

Figure 2:
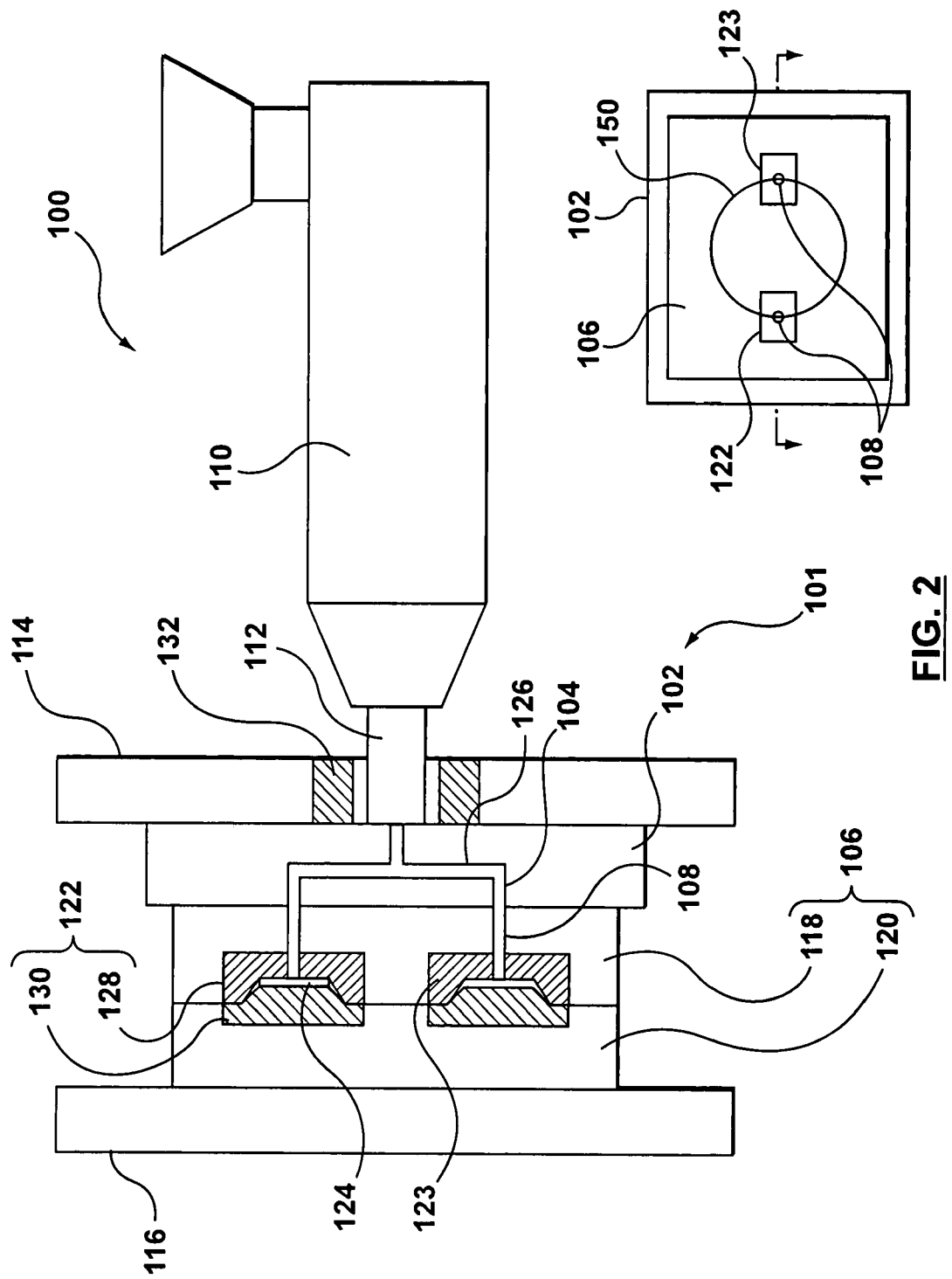
FIG. 2 is another schematic representation of a molding system of FIG. 1.
Figure 3:
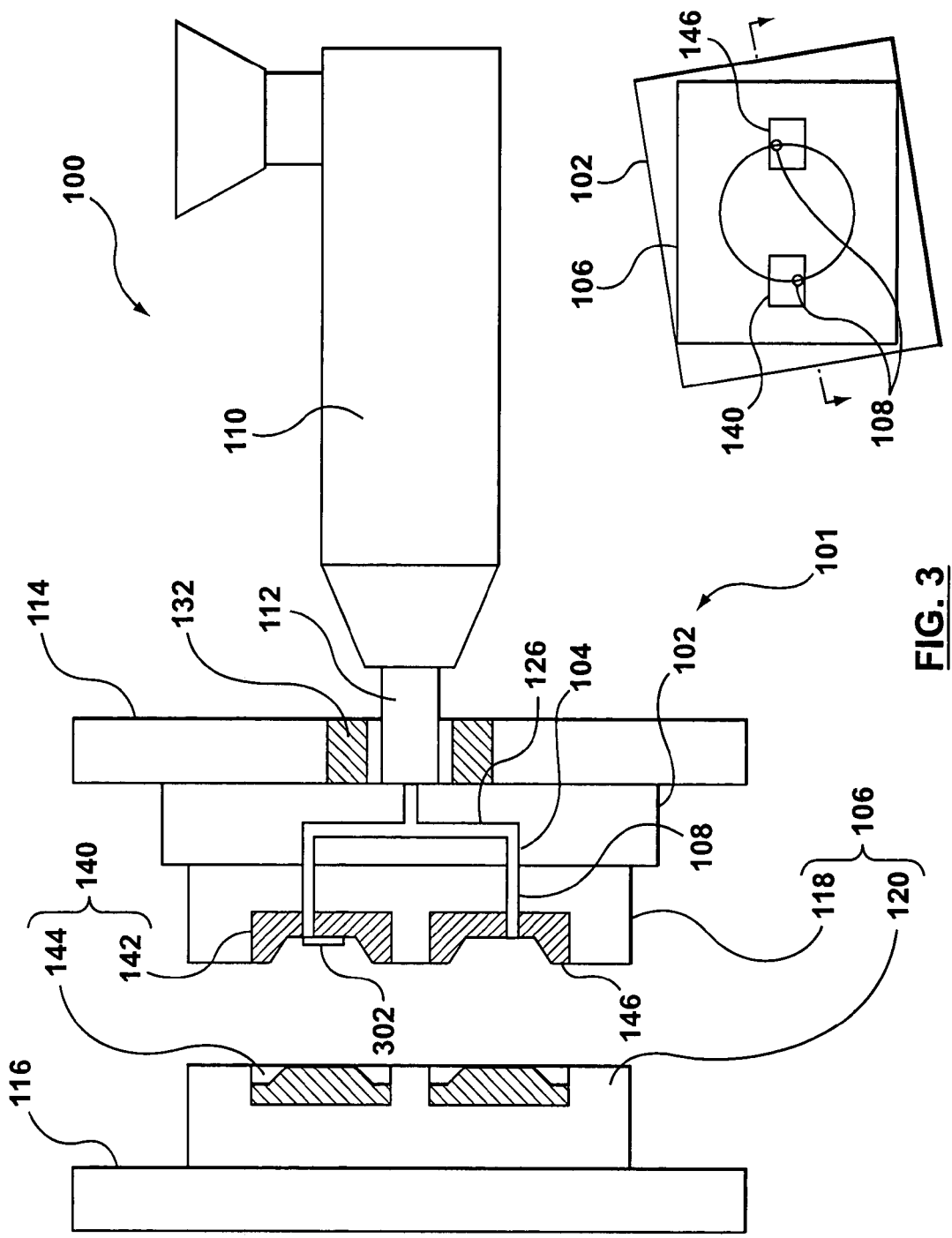
FIG. 3 is yet another schematic representation of a molding system of FIG. 1.

Preferably, the system 100 includes: (i) an extruder 110 that has a machine nozzle 112, (ii) a stationary platen 114 and (iii) a movable platen 116. The system 100 also includes a platen-stroking actuator (not depicted) and a clamping actuator (not depicted). The platen-stroking actuator and the clamping actuator (amongst other parts, assemblies, etc) are not depicted since they are items known to persons skilled in the part and therefore no further elaboration is required. The system 100 also includes (iv) a hot runner 102 that is mounted to the stationary platen 114. The system 100 also includes a mold 106. The mold 106 has a mold body. The mold 106 includes a stationary-mold base 118 (that is mounted to the stationary platen 114) and a movable-mold base 120 (that is mounted to the movable platen 116). The movable-mold base 120 and the stationary-mold base 118 are configured to receive a mold insert 122 (and/or a mold insert 123). The mold insert 122 defines a mold cavity 124. The mold insert 122 also defines a gate 108 that leads to the mold cavity 124. The mold insert 122 includes a stationary mold insert 128 (mounted in the stationary mold base 118) and also includes a movable mold insert 130 (mounted in the movable mold base 120). The hot runner 102 has a manifold 126 that is connected to the machine nozzle 112 of the extruder 110. The manifold 126 leads to a drop 104 of the hot runner 102. The drop 104 mates with the gate 108 of the mold 122 (specifically mates with the mold insert 123). The hot runner 102 and the movable-mold base 120 are adapted to accommodate adjustable connection between the drop 104 of the hot runner 102 and the gate 108 of the mold insert 122 (or the mold insert 123). Adjustable connection between the drop 104 and the gate 108 includes (i) edge gating of the mold 122 (as depicted in FIG. 3) or (ii) center gating of the mold 122 (as depicted in FIGS. 1 and 2). Preferably, accommodation of adjustable connection between the drop 104 and the gate 108 is achieved by using a rotatable ring 132 that is mounted to the stationary platen 114 and fixedly mounted to the hot runner 102 (so as to permit rotation of the hot runner 102 after the hot runner 102 is unbolted from the stationary platen 114). A quick connect/disconnect mechanism may be used in place of the bolt(s).

The hot runner 102 is (i) rotatably mountable to the stationary platen 114 (as depicted in FIG. 1) or (ii) slidably mounted to the stationary platen 114. After the hot runner 102 is rotated or moved to a desired position, the hot runner 102 is clamped and/or bolted to the stationary platen 114 so as to fix the spatial position of the hot runner 102 relative to the stationary platen 114. Located at the bottom right-hand corner of FIG. 1, there is depicted a plan view of the hot runner 102 and the mold 106. The hot runner 102 has been fixedly attached to the stationary platen 114 after having been rotated to a desired position so as to permit center gating of the mold inserts 122, 123. A travel path 150 indicates the rotational path that the drops of the hot runner will travel when the hot runner 102 is rotated (using the rotatable ring 132). The edges of the hot runner 102 and the mold 106 are depicted as squared up with each other.

FIG. 2 is another schematic representation of the system 100 of FIG. 1. The platens 114, 116 are stroked or moved together so as to close the mold 106 so that an article may be molded in the mold insert 122 (which is part of the mold 106). A platen stroking mechanism is not depicted because this mechanism, amongst other mechanisms, sub-systems, etc, of the system 100 (such as tie bars, clamping mechanisms, mold-break mechanisms and the like) are known to persons skilled in the art and as such these items will not be depicted or described.

FIG. 3 is yet another schematic representation of the system 100 of FIG. 1. New mold inserts 140, 146 are used in replacement of the mold inserts 122, 123. The mold inserts 140, 146 require edge gating rather than center gating (as required by the mold inserts 122, 123 of FIGS. 1 and 2). To rotate (that is, adjustably relocate or reposition) the hot runner 102, the following operational steps are executed: (i) the platens 114 and 116 are stroked so as to open the mold 106, (ii) the stationary mold base 118 is detached (disconnected) from the hot runner 102, (iii the hot runner 102 is detached (disconnected) from the stationary platen 114, (iv) since the hot runner 102 is rotatably supported by the rotatable ring 132, the hot runner 102 is rotated relative to the stationary platen 114 to a new (rotational) position or orientation, (v) the hot runner 102 is fixedly reattached to the stationary platen 114, and (vi) the stationary mold base 118 is reattached to the hot runner 102 so that the stationary mold base 118 and the movable mold base 120 are aligned relative to each other according to the orientation depicted in a plan view located in the lower right hand corner of FIG. 3. The hot runner 102 accommodates reattachment with the mold base 118 when the hot runner 102 and the stationary mold base 118 are positioned askew of each other as depicted in the plan view. In this way, the drop 108 of the hot runner 102 is repositioned so as to permit edge gating of the mold insert 140, 146. The plan view indicates that the hot runner 102 has been reoriented (relative to the stationary platen 114) after having been rotated to a desired position. The hot runner 102 has been rotated counter-clock wise. The edges of the hot runner 102 and the mold 106 (the mold 106 includes the mold bases 118 and 120) are no longer squared up with each other.

Figure 4:
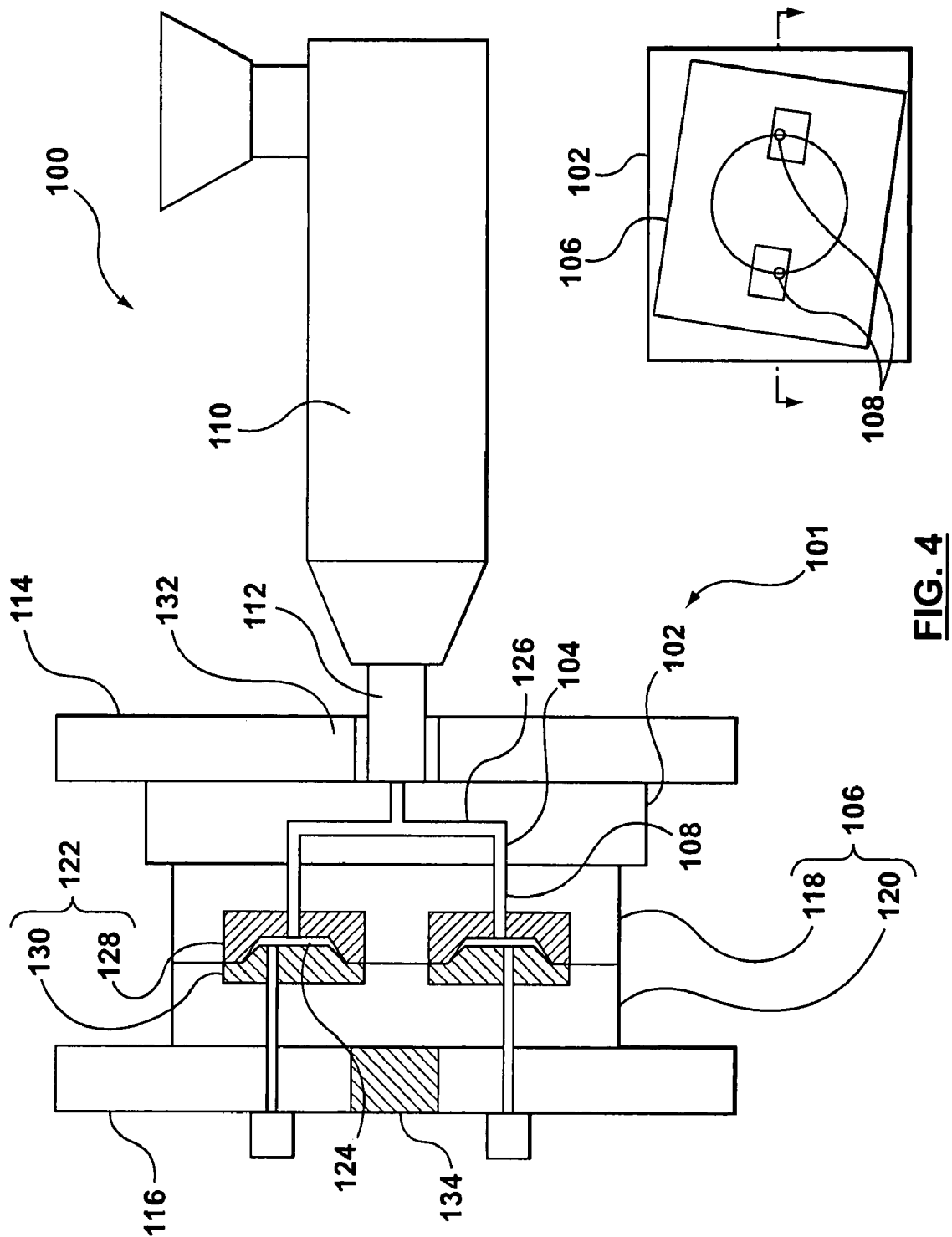
FIG. 4 is a schematic representation of a molding system according to a second exemplary embodiment.

FIG. 4 is a schematic representation of the system 100 according to the second exemplary embodiment, in which the hot runner 102 is fixedly attached to the stationary platen 114 (that is, the rotatable ring 132 is not used). A rotatable ring 134 is mounted to the movable platen 116 and is fixedly mounted to the movable-mold base 120 so as to permit rotation of the movable-mold base 120 (that is a part of the mold 106) relative to the movable platen 116. According to a variant, the movable-mold base 120 is slidably mounted to the movable platen 116.

To rotate (that is, adjustably relocate or reposition) the movable-mold base 120: (i) the platens 114 and 116 are stroked so as to open the mold 106, (ii) the movable mold base 120 is detached (disconnected) from the movable platen 116, (iii) since the movable mold base 120 is rotatably supported by the rotatable ring 134, the movable mold base 120 is rotated relative to the movable platen 116 to a new (rotational) position or orientation, (iv) the movable mold base 120 is fixedly reattached to the movable platen 116, (v) the stationary mold base 118 is detached from the hot runner 102 (the hot runner 102 remains connected to the stationary platen 114), and (vi) the stationary mold base 118 is repositioned relative to the hot runner 102 so that the stationary mold base 118 and the movable mold base 120 become aligned (once again) relative to each other. The hot runner 102 accommodates reattachment with the mold base 118. According to the orientation depicted in a plan view located in the lower right hand corner of FIG. 4, the hot runner 102 and the movable mold base 120 (which is part of the mold 106) are positioned askew of each other. In this way, the drop 108 of the hot runner 102 is repositioned so as to permit edge gating of the mold inserts 130, 128. The edges of the hot runner 102 and the mold 106 are no longer squared up with each other. The movable-mold base 120 has been rotated clock wise. According to a variant, the hot runner 102 and the mold 106 are movably arranged or mounted so as to permit positional relative adjustment of the drop 104 and the gate 108 so as to accommodate selective gating of an article to be molded in the mold 106.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Preferable embodiments of the present invention are subject of the dependent claims. Therefore, what is to be protected by way of Letters Patent are limited only by the scope of the following claims:

What is claimed is:

1. A hot runner assembly for a molding system, the molding system having a mold and having a stationary platen and a movable platen, the hot runner assembly comprising:
    a hot runner having a drop being connectable to a gate of the mold defining a mold cavity, the mold and the hot runner being orientable relative to each other so as to connect the drop in a selected location relative to the mold cavity; and
    a rotatable ring mounted to the stationary platen and fixedly mounted to the hot runner, the rotatable ring being configured to accommodate rotatable adjustable mounting of the hot runner relative to the stationary platen.

2. The hot runner assembly of claim 1, wherein:
    the drop and the gate are accommodatable of edge gating of an article to be molded in the mold.

3. The hot runner assembly of claim 1, wherein:
    the drop and the gate are accommodatable of center gating of an article to be molded in the mold.

4. The hot runner assembly of claim 1, wherein:
    the hot runner has a manifold being connectable to a machine nozzle of an extruder, the manifold leading to the drop being connectable to the gate of the mold.

5. The hot runner assembly of claim 1, wherein the mold includes:
    a stationary-mold base mountable to the stationary platen; and
    a movable-mold base mountable to the movable platen.

6. The hot runner assembly of claim 1, wherein the mold includes:
    a stationary-mold base mountable to the stationary platen; and
    a movable-mold base mountable to the movable platen, the movable-mold base and the stationary-mold base configured to receive a mold insert.

7. The hot runner assembly of claim 1, wherein the mold includes:
    a stationary-mold base mountable to the stationary platen; and
    a movable-mold base mountable to the movable platen, the movable-mold base and the stationary-mold base configured to receive a mold insert, the mold insert defining the mold cavity and the mold insert also defining the gate leading to the mold cavity.

8. The hot runner assembly of claim 1, wherein the mold includes:
    a stationary-mold base mountable to the stationary platen; and a movable-mold base mountable to the movable platen, the stationary-mold base mountable to the hot runner.

9. The hot runner assembly of claim 1, wherein the mold includes:
    a stationary-mold base mountable to the stationary platen; and
    a movable-mold base mountable to the movable platen, the stationary-mold base mountable to the hot runner, the hot runner and the movable-mold base being accommodatable of adjustable connection between the drop and the gate.

10. The hot runner assembly of claim 1, wherein the mold includes:
    a stationary-mold base mountable to the stationary platen; and
    a movable-mold base mountable to the movable platen, the stationary-mold base mountable to the hot runner,
    the movable-mold base and the stationary-mold base configured to receive a mold insert, the mold insert defining the mold cavity and the mold insert also defining the gate leading to the mold cavity,
    the hot runner and the movable-mold base being accommodatable of adjustable connection between the drop and the gate.

11. The hot runner assembly of claim 1, wherein:
    the hot runner is rotatably mounted to the stationary platen.

12. The hot runner assembly of claim 1, wherein:
    the hot runner is slidably adjustably mounted relative to the stationary platen.

13. The hot runner assembly of claim 1, wherein:
    the mold is rotatably mounted relative to the movable platen.

14. The hot runner assembly of claim 1, further comprising:
 another rotatable ring being mounted to the movable platen and fixedly mounted to the mold, the another rotatable ring being configured to accommodate rotatable adjustable mounting of the mold relative to the stationary platen.

15. The hot runner assembly of claim 1, wherein the mold includes:
 a stationary-mold base mountable to the stationary platen; and
 a movable-mold base mountable to the movable platen,
 the movable-mold base is slidably mounted relative to the movable platen.

16. The hot runner assembly of claim 1, wherein the mold includes:
 a stationary-mold base mountable to the stationary platen; and
 a movable-mold base mountable to the movable platen, the movable-mold base and the stationary-mold base configured to receive a mold insert, the mold insert includes:
  a stationary mold insert; and
  a movable mold insert, the stationary mold insert and the movable mold insert defining the mold cavity.

17. The hot runner assembly of claim 1, wherein:
 the hot runner and the mold are movably mountable so as to permit positional relative adjustment of the drop and the gate so as to accommodate selective gating of an article to be molded in the mold.

18. A molding system, comprising:
 an extruder having a machine nozzle;
 a stationery platen;
 a movable platen being configured to mountably accommodate a mold at least in part, the mold being operatively connectable with the machine nozzle of the extruder; and
 a hot runner assembly, including:
  a hot runner having a drop being connectable to a gate of the mold defining a mold cavity, the mold and the hot runner being orientable relative to each other so as to connect the drop in a selected location relative to the mold cavity; and
  a rotatable ring mounted to the stationary platen and fixedly mounted to the hot runner, the rotatable ring being configured to accommodate rotatable adjustable mounting of the hot runner relative to the stationary platen.

19. The molding system of claim 18, wherein:
 the drop and the gate are accommodatable of edge gating of an article to be molded in the mold.

20. The molding system of claim 18, wherein:
 the drop and the gate are accommodatable of center gating of an article to be molded in the mold.

21. The molding system of claim 18, wherein:
 the hot runner has a manifold being connectable to the machine nozzle of the extruder, the manifold leading to the drop being connectable to the gate of the mold.

22. The molding system of claim 18, wherein:
 the mold includes:
  a stationary-mold base mountable to the stationary platen; and
  a movable-mold base mountable to the movable platen.

23. The molding system of claim 18, wherein the mold includes:
 a stationary-mold base mountable to the stationary platen; and
 a movable-mold base mountable to the movable platen, the movable-mold base and the stationary-mold base configured to receive a mold insert.

24. The molding system of claim 18, wherein the mold includes:
 a stationary-mold base mountable to the stationary platen; and
 a movable-mold base mountable to the movable platen, the movable-mold base and the stationary-mold base configured to receive a mold insert, the mold insert defining the mold cavity and the mold insert also defining the gate leading to the mold cavity.

25. The molding system of claim 18, wherein the mold includes:
 a stationary-mold base mountable to the stationary platen; and
 a movable-mold base mountable to the movable platen, the stationary-mold base mountable to the hot runner.

26. The molding system of claim 18, wherein the mold includes:
 a stationary-mold base mountable to the stationary platen; and
 a movable-mold base mountable to the movable platen, the stationary-mold base mountable to the hot runner, the hot runner and the movable-mold base being accommodatable of adjustable connection between the drop and the gate.

27. The molding system of claim 18, wherein the mold includes:
 a stationary-mold base mountable to the stationary platen; and
 a movable-mold base mountable to the movable platen, the stationary-mold base mountable to the hot runner, the movable-mold base and the stationary-mold base configured to receive a mold insert, the mold insert defining the mold cavity and the mold insert also defining the gate leading to the mold cavity, the hot runner and the movable-mold base being accommodatable of adjustable connection between the drop and the gate.

28. The molding system of claim 18, wherein:
 the hot runner is rotatably mounted to the stationary platen.

29. The molding system of claim 18, wherein:
 the hot runner is slidably adjustably mounted relative to the stationary platen.

30. The molding system of claim 18, wherein:
 the mold is rotatably mounted relative to the movable platen.

31. The molding system of claim 18, further comprising:
 another rotatable ring being mounted to the movable platen and fixedly mounted to the mold, the another rotatable ring being configured to accommodate rotatable adjustable mounting of the mold relative to the stationary platen.

32. The molding system of claim 18, wherein the mold includes:
 a stationary-mold base mountable to the stationary platen; and
 a movable-mold base mountable to the movable platen,
 the movable-mold base is slidably mounted relative to the movable platen.

33. The molding system of claim 18, wherein the mold includes:

a stationary-mold base mountable to the stationary platen; and a movable-mold base mountable to the movable platen, the movable-mold base and the stationary-mold base configured to receive a mold insert, the mold insert includes:

a stationary mold insert; and a movable mold insert, the stationary mold insert and the movable mold insert defining the mold cavity.

34. The molding system of claim 18, wherein:

the hot runner and the mold are movably mountable so as to permit positional relative adjustment of the drop and the gate so as to accommodate selective gating of an article to be molded in the mold.

* * * * *